(12) United States Patent
Nihei

(10) Patent No.: US 12,405,449 B2
(45) Date of Patent: Sep. 2, 2025

(54) OPTICAL LENS SYSTEM, CAMERA AND TERMINAL

(71) Applicant: HUAWEI TECHNOLOGIES CO., LTD., Guangdong (CN)

(72) Inventor: Yasuhide Nihei, Tokyo (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 627 days.

(21) Appl. No.: 17/722,070

(22) Filed: Apr. 15, 2022

(65) Prior Publication Data
US 2022/0291486 A1    Sep. 15, 2022

Related U.S. Application Data

(63) Continuation of application No. PCT/CN2019/111741, filed on Oct. 17, 2019.

(51) Int. Cl.
G02B 13/00 (2006.01)
G02B 9/62 (2006.01)

(52) U.S. Cl.
CPC ........... *G02B 13/0045* (2013.01); *G02B 9/62* (2013.01)

(58) Field of Classification Search
CPC ............................ G02B 13/00445; G02B 9/62
See application file for complete search history.

(56) References Cited

U.S. PATENT DOCUMENTS

| | | |
|---|---|---|
| 2006/0274433 A1 | 12/2006 | Kamo |
| 2015/0138425 A1 | 5/2015 | Lee et al. |
| 2017/0108665 A1 | 4/2017 | Huang |
| 2018/0052304 A1 | 2/2018 | Wu et al. |
| 2018/0120539 A1 | 5/2018 | Gong et al. |

FOREIGN PATENT DOCUMENTS

| | | |
|---|---|---|
| CN | 105242374 A | 1/2016 |
| CN | 104765132 B | 7/2017 |
| CN | 206930825 U | 1/2018 |
| CN | 107976786 A | 5/2018 |
| CN | 108152934 A | 6/2018 |
| CN | 108761717 A | 11/2018 |
| CN | 109270665 A | 1/2019 |
| CN | 109752825 A | 5/2019 |
| JP | S58184917 A | 10/1983 |
| JP | H07294808 A | 11/1995 |
| JP | H08122634 A | 5/1996 |

(Continued)

*Primary Examiner* — Wyatt A Stoffa
*Assistant Examiner* — Grant A Gagnon
(74) *Attorney, Agent, or Firm* — WOMBLE BOND DICKINSON (US) LLP

(57) ABSTRACT

The present disclosure relates to a six-piece optical lens system comprising, in order from the object side surface to the image side surface, a 1st lens element with a positive refractive power; a 2nd lens element with a negative refractive power; a 3rd lens element with a positive refractive power; a 4th lens element with a negative refractive power; a 5th lens element with a positive refractive power, having a convex image-side surface in the center; and a 6th lens element. It satisfies the relations: 1.05<L4ET/L4CT<2.7 and 0.23<L6ET/L6CT<0.95, where L4CT is the center thickness of the 4th lens element, the L4ET is the edge thickness of the 4th lens element, L6CT is the center thickness of the 6th lens element, and L6ET is the edge thickness of the 6th lens element.

20 Claims, 12 Drawing Sheets

(56) References Cited

FOREIGN PATENT DOCUMENTS

| | | |
|---|---|---|
| JP | 2014026254 A | 2/2014 |
| JP | 2015106026 A | 6/2015 |
| JP | 2018116240 A | 7/2018 |
| JP | 2019152942 A | 9/2019 |
| WO | 2014175058 A1 | 10/2014 |

OPTICAL LENS SYSTEM, CAMERA AND TERMINAL

CROSS-REFERENCE TO RELATED APPLICATIONS

This application is a continuation of International Application No. PCT/CN2019/111741, filed on Oct. 17, 2019, the disclosure of which is hereby incorporated by reference in its entirety.

FIELD OF THE DISCLOSURE

The present disclosure relates to an optical lens system for taking images, and more particularly to a six-piece optical lens system with a low incidence angle to an image sensor, which is miniaturized to be installed in a mobile device camera such as a mobile phone camera.

BACKGROUND OF THE DISCLOSURE

In recent years, with the popularity of mobile phone cameras, optical lens systems for taking images have become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors is continually being reduced, and miniaturized optical lens systems for taking images have increasingly higher resolutions.

Therefore, there is a strong demand for downsizing of current optical lens units. Similarly, in the case of a mobile phone, miniaturization of the optical lens unit is required in order to minimize the size of the mobile phone itself and secure a space for mounting multiple functions.

Due to strict size limitations, conventional portable lenses tend to have large incidence angles to shorten the total optics length. At the same time, it is known that it is preferable that the incidence angle of light to the image sensor be low (close to parallel to the optical axis) for various reasons since one degree difference of the incidence angle to the image sensor can significantly affect the optical design and the image quality. The incidence angle to the image sensor may be a major factor for the optimal optical lens design.

However, it has been known that the miniaturization of the optical lens system contradicts the reduction of the incidence angle to the image sensor. An optical lens system, in which a chief ray of angle (CRA) is low, always becomes big and long, which is not suitable for mobile devices. Therefore, how to provide an optical lens system with small size and low incidence angle at the same time is set forth in this disclosure.

SUMMARY OF THE DISCLOSURE

The primary objective of the present disclosure is to provide a low CRA lens with six optical lens elements for imaging a high quality image without having an excessively long total track length (TTL). The low CRA lens system can be applied easier to a high resolution mobile device camera thanks to its high resolution, short TTL, low height and low CRA. The low CRA lens system is also suitable for a sensing camera as mentioned-above.

A six-piece optical lens system in accordance with the present disclosure comprises, in order from the object-side surface to the image-side surface, a 1st lens element with a positive refractive power, a 2nd lens element with a negative refractive power, a 3rd lens element with a positive refractive power, a 4th lens element with a negative refractive power, a 5th lens element with a positive refractive power, having a convex image-side surface in the center, and a 6th lens element. L4CT is the center thickness of the 4th lens element, L4ET is the edge thickness of the 4th lens element, L6CT is the center thickness of the 6th lens element, and L6ET is the edge thickness of the 6th lens element; they satisfy the relation $1.05<L4ET/L4CT<2.7$ and $0.23<L6ET/L6CT<0.95$. L4ET/L4CT defines the optimal shape of the fourth lens for lowering the incident angle to the image sensor. L6ET/L6CT defines the optimal shape of the sixth lens for lowering the incident angle to the image sensor. The following range is more preferable for L4ET/L4CT and L6ET/L6CT.

In one embodiment, $1.6<L4ET/L4CT<2.2$.

In one embodiment, $0.3<L6ET/L6CT<0.8$.

According to one aspect of the present six-piece optical lens system, a maximum incidence angle of the chief ray to an image sensor is CRA, and a total track length (TTL: from an object-side surface of the 1st lens element to an imaging surface) of the six-piece optical lens system is TTL, and they satisfy the relation $2.2<CRA/TTL<4.0$. CRA/TTL ensures preferable optical performance and defines the optimum conditions for the incident angle to the image sensor and optical total length. The following range is more preferable for CRA/TTL.

In one embodiment, $2.2<CRA/TTL<3.1$.

According to one aspect of the present six-piece optical lens system, a maximum incidence angle of the chief ray to an image sensor is CRA, and a composite focal length from the 1st lens element to the 4th lens element is f1234, and they satisfy the relation $1.2<CRA/f1234<4.0$. CRA/f1234 defines the conditions for lowering the incident angle to the image sensor and realizing preferable optical performance. The following range is more preferable for CRA/f1234.

In one embodiment, $1.9<CRA/f1234<3.3$.

According to one aspect of the present six-piece optical lens system, a composite focal length from the 1st lens element to the 4th lens element is f1234, a focal length of the six-piece optical lens system is fa, and they satisfy the relation $0.27<fa/f1234<0.77$. fa/f1234 regulates the balance between the total refractive power from the first lens to the fourth lens and the total optical length in order to lower the incident angle to the image sensor and ensure preferable good optical performance. The following range is more preferable for fa/f1234

In one embodiment, $0.4<fa/f1234<0.77$.

According to one aspect of the present six-piece optical lens system, a composite focal length from the 1st lens element to the 4th lens element is f1234, a composite focal length from the 5th lens element to the 6th lens element is f56, and they satisfy the relation $0.77<f1234/f56<4.5$. f1234/f56 defines the refractive power of the fifth lens and the sixth lens for lowering the incident angle to the image sensor and ensuring preferable optical performance. The following range is more preferable for f1234/f56.

In one embodiment, $1.0<f1234/f56<2.5$.

According to one aspect of the present six-piece optical lens system, a focal length of the six-piece optical lens system is fa, a composite focal length from the 5th lens element to the 6th lens element is f56, and they satisfy the relation $0.55<fa/f56<1.4$. fa/f56 defines the balance of the combined refractive power from the fifth lens to the sixth lens in order to lower the incident angle to the image sensor and reduce the overall optical length. The following range is more preferable for fa/f56.

In one embodiment, 0.7<fa/f56<1.4.

According to one aspect of the present six-piece optical lens system, a total track length (from an object-side surface of the 1st lens element to an imaging surface) of the six-piece optical lens system is TTL, a composite focal length from the 5th lens element to the 6th lens element is f56, and they satisfy the relation 0.75<TTL/f56<2.2. TTL/f56 defines the balance between the combined refractive power from the fifth lens to the sixth lens and the total optical length in order to reduce the height of the total optical length while lowering the incident angle to the image sensor. The following range is more preferable for TTL/f56.

In one embodiment, 0.95<TTL/f56<1.75.

According to a second aspect, a camera is provided. The camera comprises a six-piece optical lens system and an image sensor. The six-piece optical lens system is according to any six-piece optical lens system mentioned in the first aspect. In particular, the six-piece optical lens system is configured to input light, which is used to carrying image data, to the image sensor; and the image sensor is configured to display an image according the image data. With the second aspect, various optical filters can be used in front of an image sensor because the lens has a very low incident angle so that the incident angle dependency does not have to be considered.

According to a third aspect, a terminal is provided. The terminal comprises a camera, which is the camera provided in the second aspect, and a Graphic Processing Unit (GPU). The camera is connected with the camera. The camera is configured to obtain image data and input the image data into the GPU, and the CPU is configured to process the image data received from the camera. The terminal can be applied to a high resolution mobile device camera such as a mobile phone camera because of its high resolution, short TTL, low height and low CRA.

The present disclosure will be presented in further detail from the following descriptions with the accompanying drawings, which show, for purpose of illustration only, the preferred embodiments in accordance with the present disclosure.

BRIEF DESCRIPTION OF THE DRAWINGS

The disclosure can be better understood from the following detailed description of non-limiting embodiments thereof, and on examining the accompanying drawings, in which:

FIG. 1-2 shows the longitudinal spherical aberration curve, the astigmatic field curve, and the distortion curve of the first embodiment of the present disclosure.

FIG. 1-3 shows the incidence angle of a chief ray of the first embodiment of the present disclosure.

FIG. 2-1 shows a cross-sectional illustration of an optical lens system in accordance with a second embodiment of the present disclosure.

FIG. 2-2 shows the longitudinal spherical aberration curve, the astigmatic field curve, and the distortion curve of the second embodiment of the present disclosure.

FIG. 2-3 shows the incidence angle of a chief ray of the second embodiment of the present disclosure.

FIG. 3-1 shows a cross-sectional illustration of an optical lens system in accordance with a third embodiment of the present disclosure.

FIG. 3-2 shows the longitudinal spherical aberration curve, the astigmatic field curve, and the distortion curve of the third embodiment of the present disclosure.

FIG. 3-3 shows the incidence angle of a chief ray of the third embodiment of the present disclosure.

FIG. 4-1 shows a cross-sectional illustration of an optical lens system in accordance with a fourth embodiment of the present disclosure.

FIG. 4-2 shows the longitudinal spherical aberration curve, the astigmatic field curve, and the distortion curve of the fourth embodiment of the present disclosure.

FIG. 4-3 shows the incidence angle of a chief ray of the fourth embodiment of the present disclosure.

FIG. 5-1 shows a cross-sectional illustration of an optical lens system in accordance with a fifth embodiment of the present disclosure.

FIG. 5-2 shows the longitudinal spherical aberration curve, the astigmatic field curve, and the distortion curve of the fifth embodiment of the present disclosure.

FIG. 5-3 shows the incidence angle of a chief ray of the fifth embodiment of the present disclosure.

FIG. 6-1 shows a cross-sectional illustration of an optical lens system in accordance with a sixth embodiment of the present disclosure.

FIG. 6-2 shows the longitudinal spherical aberration curve, the astigmatic field curve, and the distortion curve of the sixth embodiment of the present disclosure.

FIG. 6-3 shows the incidence angle of a chief ray of the sixth embodiment of the present disclosure.

DETAILED DESCRIPTION OF THE PREFERRED EMBODIMENTS

The following embodiments of the low CRA six-piece optical lens system of the present disclosure will be described referring to the figures and the optical data. This lens system can be applied to a high resolution mobile device camera such as a mobile phone camera. In addition, the arrangement of the lens elements is effective to for achieving a low incidence angle to an image sensor and a relatively short total track length (TTL) for any optical filter such as an IR cut filter disposed in front of the image sensor.

A low incidence angle to the image sensor makes it easier for the optical designer to choose an optical filter disposed between the optics and the image sensor since there will be less optical effects by the incidence angle to the image sensor. The optical designer cannot use some optical filters when the incidence angle of the optics is out of the range where the optical filters need to be used to realize the required effects. They cannot be used for a sensing camera either since a sensing camera, such as a hyper spectrum camera, tends to have some incidence angle dependency.

When the incidence angle to the image sensor is close to parallel, the light sensitivity of the image sensor is increased so that the optical design can be performed regardless of the characteristics of the filter to be used, aligning of the image sensor become less sensitive, and the lens system can be used for both imaging and sensing.

First Embodiment

Figure 1:
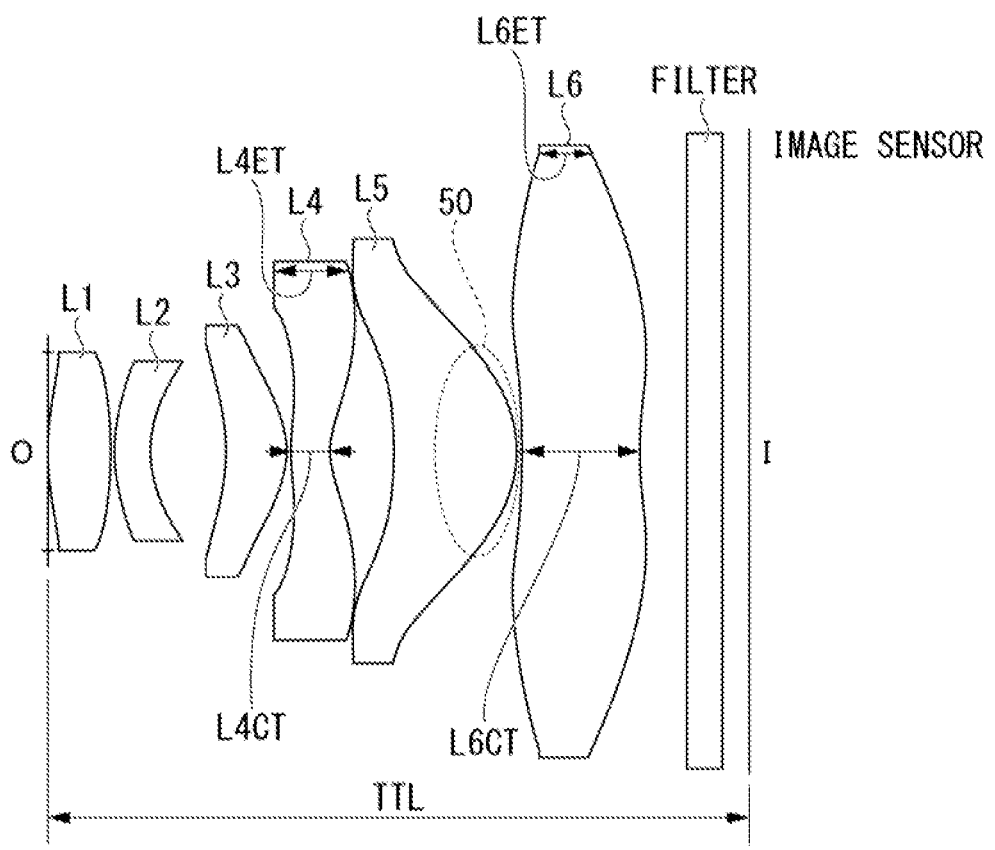
FIG. 1-1 shows a cross-sectional illustration of an optical lens system in accordance with a first embodiment of the present disclosure.

FIG. 1-1 shows a cross-sectional illustration of a first embodiment of a six-piece optical lens system. FIG. 1-1 also shows a filter in front of an image sensor surface I.

In the first embodiment, the six-piece optical lens system comprises, in order from the object side O to the image side I, a 1st lens element L1, a 2nd lens element L2, a 3rd lens element L3, a 4th lens element L4, a 5th lens element L5, and a 6th lens element L6. The 1st lens element L1 has a positive refractive power, the 2nd lens element L2 has a negative refractive power, the 3rd lens element has a positive refractive power, the 4th lens element L4 has a negative refractive power, the 5th lens element L5 has a positive refractive power and a convex image-side surface 50 in the center, and the 6th lens element L6. Each lens element has a front surface R1 on the object side O and a rear surface R2 on the image side I.

Table 1-1 shows the radius of curvature (r) and the thickness or separation (d) for each of the optical surfaces, and refractive index (N) and the Abbe number (v) for each of the lens elements of the six-piece optical lens system of the first embodiment. In Table 1-1, the term "stop" stands for an iris surface, and IRCF stands for IR cut filter.

TABLE 1-1

| Surface | | Radius | Thickness | Refractive Index(N) | Abbe Number(v) |
|---|---|---|---|---|---|
| Stop | | Infinity | 0 | — | — |
| L1 | R1 | 1.836 | 0.364 | 1.54 | 56.0 |
| | R2 | −2.522 | 0.024 | | |
| L2 | R1 | 1.157 | 0.208 | 1.67 | 19.2 |
| | R2 | 0.687 | 0.446 | | |
| L3 | R1 | −1.144 | 0.356 | 1.54 | 56.0 |
| | R2 | −0.532 | 0.024 | | |
| L4 | R1 | 1.082 | 0.228 | 1.57 | 37.4 |
| | R2 | 0.383 | 0.374 | | |
| L5 | R1 | −5.331 | 0.722 | 1.54 | 55.6 |

TABLE 1-1-continued

| Surface | | Radius | Thickness | Refractive Index(N) | Abbe Number(v) |
|---|---|---|---|---|---|
| | R2 | −1.459 | 0.031 | | |
| L6 | R1 | 2.300 | 0.691 | 1.54 | 55.6 |
| | R2 | 2.620 | 0.280 | | |
| IRCF | R1 | Infinity | 0.210 | 1.52 | 64.2 |
| | R2 | Infinity | 0.150 | | |
| Sensor | | Infinity | 0.000 | — | — |

Table 1-2 shows the aspheric coefficients for each of the optical surfaces of the six-piece optical lens system, wherein numbers 3, 4, 5, . . . , 10 represent the high-order of aspheric coefficients. The equation of the aspheric surface profiles is expressed as follows:

$$X(Y) = \frac{\left(\frac{Y^2}{R}\right)}{1 + \sqrt{1 - \frac{(1+k)*Y^2}{R^2}}} + \sum_i A_i * Y^i$$

wherein:

X: the height of a point on the aspheric surface at a distance Y from the optical axis relative to the tangential plane at the aspheric surface vertex;

Y: the distance from a point on the curve of the aspheric surface to the optical axis;

k: the conic coefficient;

Ai: the aspheric coefficient of order i.

TABLE 1-2

ASPHERIC COEFFICIENTS

| Surface | | Conic | 3 | 4 | 5 | 6 |
|---|---|---|---|---|---|---|
| L1 | R1 | 0.0000 | 0.0000E+00 | −1.0864E−01 | 0.0000E+00 | −3.9684E−01 |
| | R2 | 0.0000 | 0.0000E+00 | 2.6930E−01 | 1.0000E+00 | −2.2932E+00 |
| L2 | R1 | −10.0000 | 0.0000E+00 | 8.7467E−01 | 0.0000E+00 | −3.6627E+00 |
| | R2 | −4.7255 | 0.0000E+00 | 1.1659E+00 | 0.0000E+00 | −3.1612E+00 |
| L3 | R1 | −10.0000 | 0.0000E+00 | −1.0942E−01 | 0.0000E+00 | −8.0950E−01 |
| | R2 | −3.4272 | 0.0000E+00 | 1.0103E−01 | 0.0000E+00 | −1.8531E+00 |
| L4 | R1 | −0.9058 | −7.0467E−01 | −2.7233E+00 | 1.0525E+01 | −1.7204E+01 |
| | R2 | −3.8774 | −1.5671E+00 | 4.1951E+00 | −8.0802E+00 | 1.1388E+01 |
| L5 | R1 | 0.0000 | −1.9231E−01 | −9.3348E−01 | 2.8049E+00 | −5.0612E+00 |
| | R2 | 0.0000 | −1.8614E+00 | 3.4399E+00 | −1.8982E+00 | −1.1162E+00 |
| L6 | R1 | 0.0000 | −1.7071E+00 | 3.0828E+00 | −2.5159E+00 | 1.2123E+00 |
| | R2 | 0.0000 | 3.6492E−01 | −1.4219E+00 | 8.7774E−01 | 2.2225E−01 |

| Surface | | 7 | 8 | 9 | 10 |
|---|---|---|---|---|---|
| L1 | R1 | 0.0000E+00 | 8.5213E−02 | 0.0000E+00 | −1.9256E+00 |
| | R2 | 1.0000E+00 | 3.8821E+00 | 1.0000E+00 | −3.3814E+00 |
| L2 | R1 | 0.0000E+00 | 6.2522E+00 | 0.0000E+00 | −2.8960E+00 |
| | R2 | 0.0000E+00 | 3.8419E+00 | 0.0000E+00 | −5.9384E−02 |
| L3 | R1 | 0.0000E+00 | 7.5203E+00 | 0.0000E+00 | −1.2017E+01 |
| | R2 | 0.0000E+00 | 7.6695E+00 | 0.0000E+00 | −8.1895E+00 |
| L4 | R1 | 1.4396E+01 | −5.6326E+00 | 1.7002E+00 | −1.2173E+00 |
| | R2 | −1.1476E+01 | 7.6575E+00 | −2.9437E+00 | 4.8028E−01 |
| L5 | R1 | 5.1075E+00 | −1.2847E+00 | −1.1156E+00 | 5.3026E−01 |
| | R2 | 1.2661E+00 | 5.9752E−01 | −8.3040E−01 | 1.9883E−01 |
| L6 | R1 | −5.2143E−01 | 2.3732E−01 | −7.1744E−02 | 8.8311E−03 |
| | R2 | −2.0293E−01 | −1.7635E−01 | 1.5025E−01 | −2.8858E−02 |

Table 1-3 shows the angle of view (FOV), F number (Fno), and total track length (from an object-side surface of the 1st lens element to an imaging surface) of the six-piece optical lens system (TTL) of the six-piece optical lens system of the first embodiment. Table 1-3 also shows each value for L4ET/L4CT, L6ET/L6CT, CRA/TTL, CRA/f1234, fa/f1234, f1234/f56, fa/f56, and TTL/f56, where L4CT is the center thickness of the 4th lens element, L4ET is the edge thickness of the 4th lens element, L6CT is the center thickness of the 6th lens element, L6ET is the edge thickness of the 6th lens element, CRA is a maximum incidence angle of the chief ray to an image sensor, TTL is a total track length of the six-piece optical lens system, f1234 is a composite focal length from the 1st lens element to the 4th lens element, f56 is a composite focal length from the 5th lens element to the 6th lens element, and fa is a focal length of the six-piece optical lens system. These are parameters used for defining the optical conditions of the present disclosure.

TABLE 1-3

| | |
|---|---|
| FOV | 65.6 deg |
| Fno | 2.4 |
| TTL | 4.1 |
| L4ET/L4CT | 1.9 |
| L6ET/L6CT | 0.5 |
| CRA/TTL | 2.4 |
| CRA/f1234 | 2.1 |
| fa/f1234 | 0.6 |
| f1234/f56 | 1.7 |
| fa/f56 | 1.0 |
| TTL/f56 | 1.5 |

Figures 1, 2:
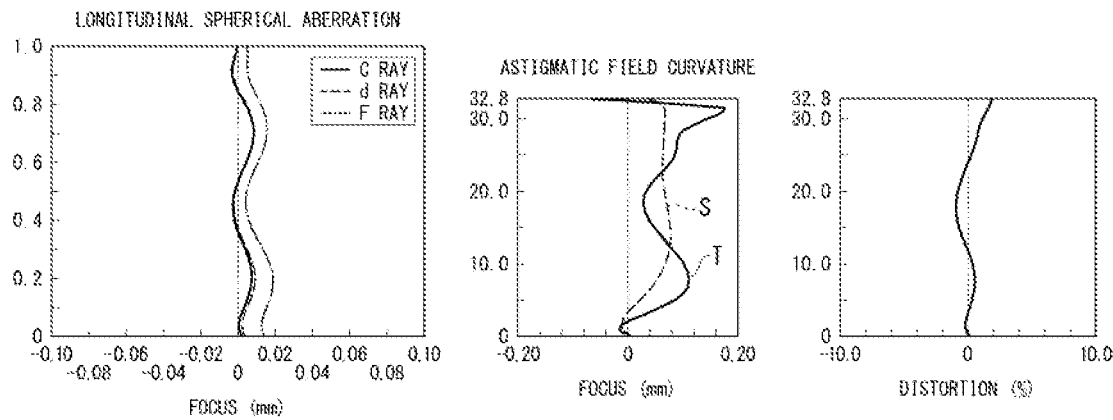

FIG. 1-2 shows the longitudinal spherical aberration curve, the astigmatic field curve, and the distortion curve of the first embodiment of the present disclosure, which show the image quality.

Figures 1, 2, 3:
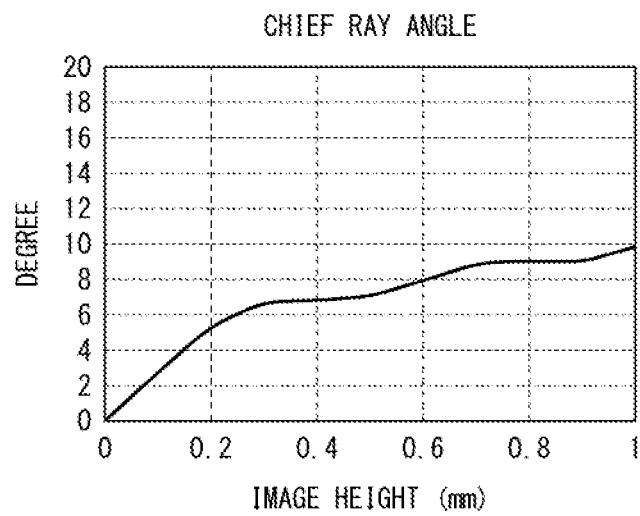
Figures 1, 2:
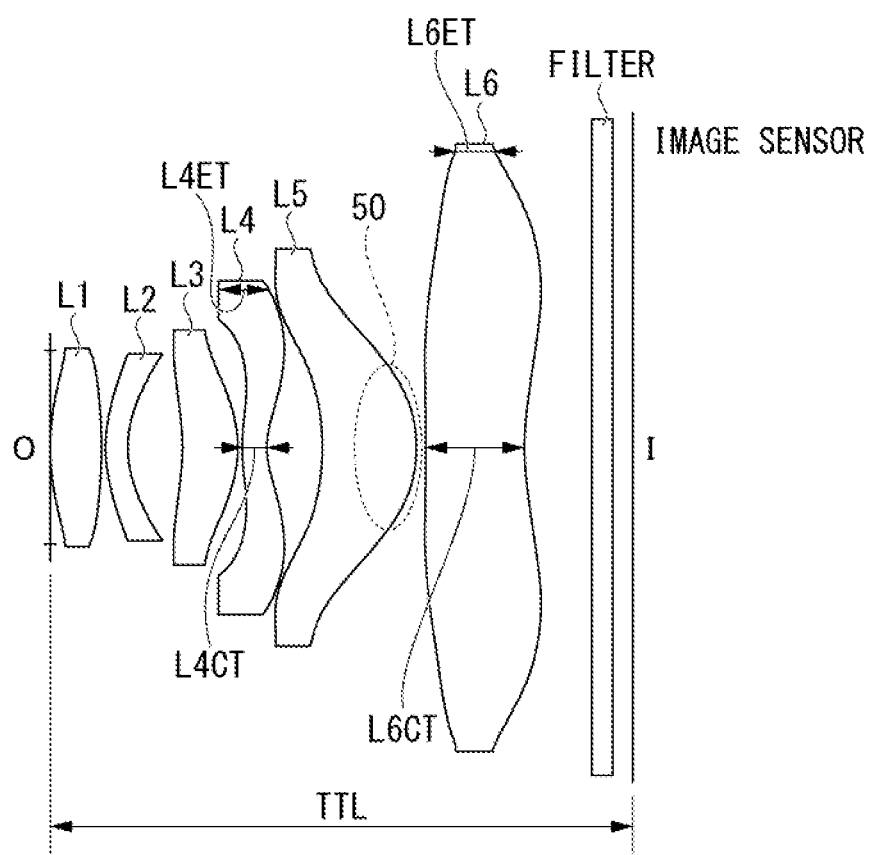
Figure 2:
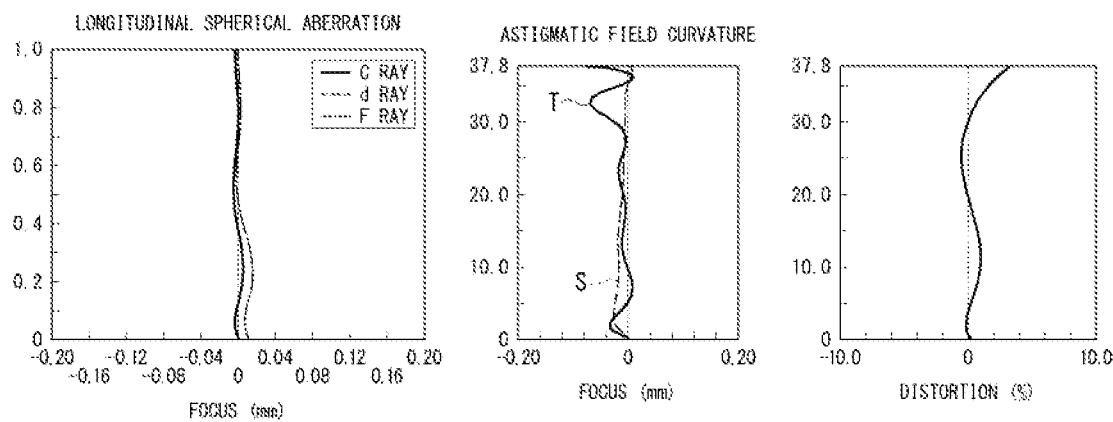
Figures 2, 3:
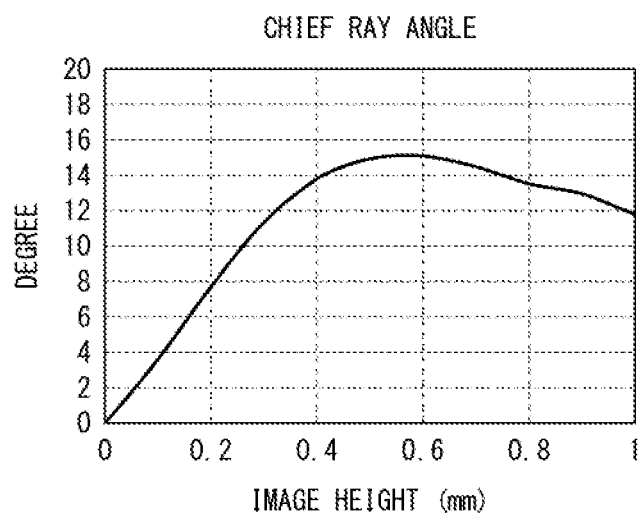
Figures 1, 3:
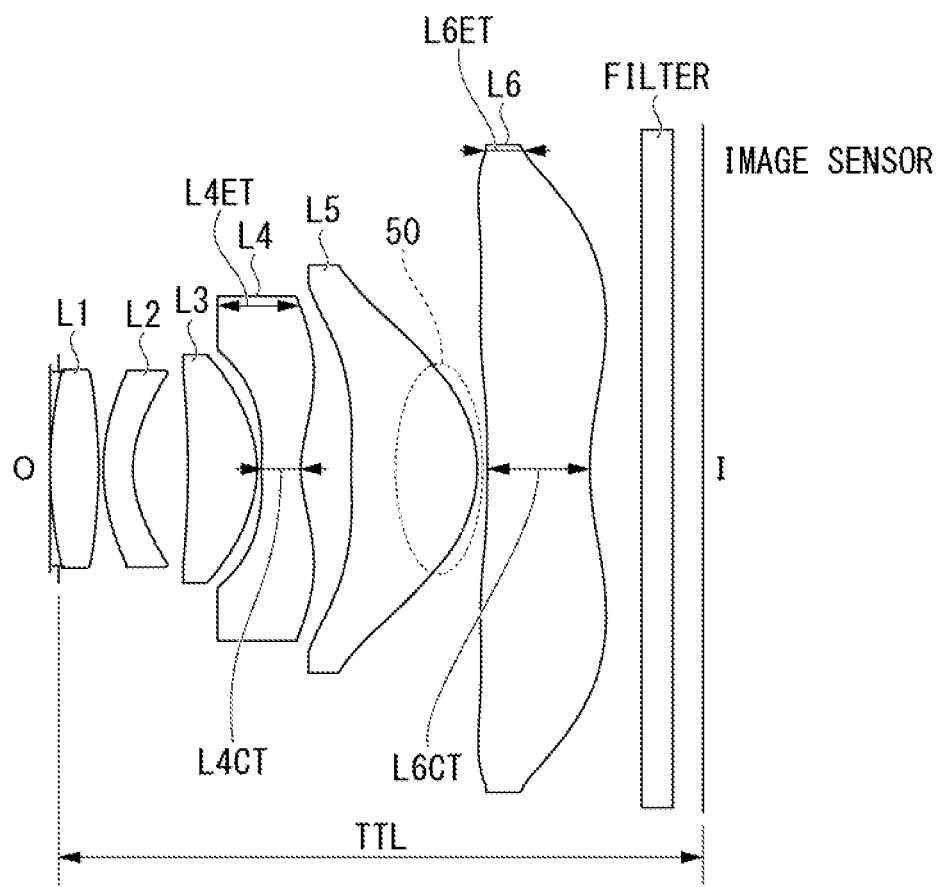
Figures 2, 3:
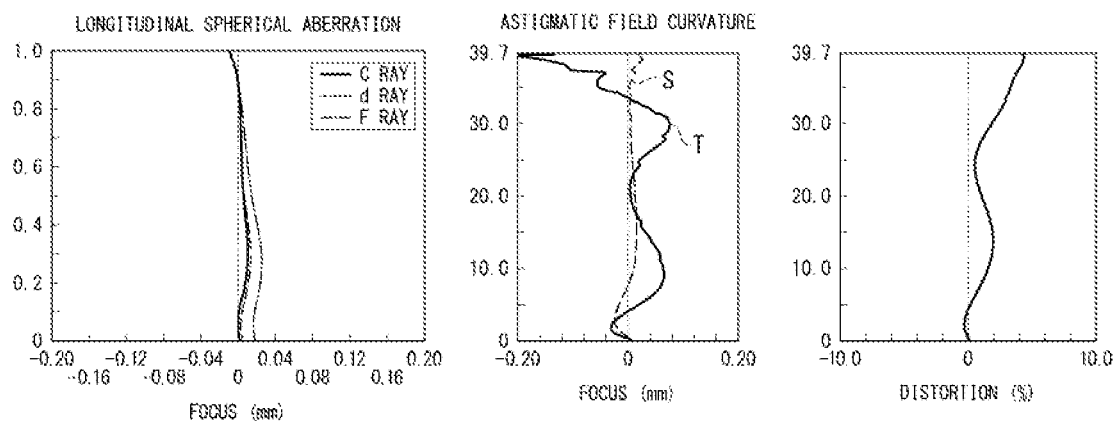
Figure 3:
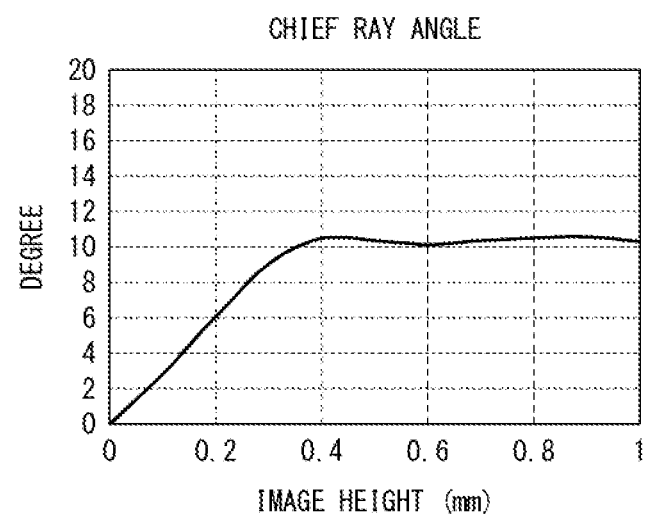

FIG. 1-3 shows the incidence angle of a chief ray of the first embodiment of the present disclosure, which show a maximum incidence angle of the chief ray to an image sensor is less than 10 degrees, while conventional optical lens systems have less than 35 degrees of incidence angle to an image sensor. A conventional low incidence angle optical lens system may have less than 20 degrees of incidence angle to an image sensor.

Second Embodiment

FIG. 2-1 shows a cross-sectional illustration of a second embodiment of a six-piece optical lens system. FIG. 2-1 also shows a filter in front of an image sensor surface I.

In the second embodiment, the six-piece optical lens system comprises elements same as the First embodiment, providing TTL which is longer than that of the first embodiment.

Table 2-1 shows the radius of curvature (r) and the thickness or separation (d) for each of the optical surfaces, and refractive index (N) and the Abbe number (v) for each of the lens elements of the six-piece optical lens system of the second embodiment.

TABLE 2-1

| Surface | | Radius | Thickness | Refractive Index(N) | Abbe Number(v) |
|---|---|---|---|---|---|
| Stop | | Infinity | 0 | — | — |
| L1 | R1 | 2.590 | 0.507 | 1.54 | 56.0 |
| | R2 | −4.547 | 0.040 | | |
| L2 | R1 | 1.548 | 0.220 | 1.67 | 19.2 |
| | R2 | 1.012 | 0.548 | | |
| L3 | R1 | −2.961 | 0.557 | 1.54 | 56.0 |
| | R2 | −1.158 | 0.040 | | |
| L4 | R1 | 1.424 | 0.246 | 1.57 | 37.4 |
| | R2 | 0.699 | 0.553 | | |
| L5 | R1 | −4.751 | 0.937 | 1.54 | 55.6 |
| | R2 | −2.212 | 0.090 | | |
| L6 | R1 | 3.447 | 0.994 | 1.54 | 55.6 |
| | R2 | 3.438 | 0.670 | | |
| IRCF | R1 | Infinity | 0.210 | 1.52 | 64.2 |
| | R2 | Infinity | 0.200 | | |
| Sensor | | Infinity | 0.000 | — | — |

Table 2-2 shows the aspheric coefficients for each of the optical surfaces of the six-piece optical lens system, wherein numbers 3, 4, 5, . . . , 10 represent the high-order of aspheric coefficients.

TABLE 2-2

| ASPHERIC COEFFICIENTS | | | | | | |
|---|---|---|---|---|---|---|
| Surface | | Conic | 3 | 4 | 5 | 6 |
| L1 | R1 | 0.0000 | 0.0000E+00 | −8.5968E−03 | 0.0000E+00 | −2.7655E−02 |
| | R2 | 0.0000 | 0.0000E+00 | 9.1684E−02 | 1.0000E+00 | −1.5455E−01 |
| L2 | R1 | −10.0000 | 0.0000E+00 | 1.5830E−01 | 0.0000E+00 | −1.9750E−01 |
| | R2 | −4.7255 | 0.0000E+00 | 1.8165E−01 | 0.0000E+00 | −1.7295E−01 |
| L3 | R1 | −10.0000 | 0.0000E+00 | 2.0791E−02 | 0.0000E+00 | −1.5504E−02 |
| | R2 | −3.4272 | 0.0000E+00 | 4.5603E−02 | 0.0000E+00 | −8.9671E−02 |
| L4 | R1 | −0.9058 | −3.1236E−01 | −4.2380E−01 | 6.3888E−01 | −2.5487E−01 |
| | R2 | −3.8774 | −5.8198E−01 | 9.6188E−01 | −1.2138E+00 | 9.5441E−01 |
| L5 | R1 | 0.0000 | −1.9988E−01 | 1.1264E−01 | −5.5978E−02 | −1.3970E−01 |
| | R2 | 0.0000 | −6.0713E−01 | 7.1919E−01 | −3.0695E−01 | −9.7423E−02 |
| L6 | R1 | 0.0000 | −4.8365E−01 | 5.4993E−01 | −2.7747E−01 | 7.6701E−02 |
| | R2 | 0.0000 | 1.1323E−01 | −1.9266E−01 | 3.0538E−02 | 3.5933E−02 |

TABLE 2-2-continued

ASPHERIC COEFFICIENTS

| Surface | | 7 | 8 | 9 | 10 |
|---|---|---|---|---|---|
| L1 | R1 | 0.0000E+00 | −1.4468E−03 | 0.0000E+00 | −1.7448E−02 |
|    | R2 | 1.0000E+00 | 7.0936E−02 | 1.0000E+00 | −2.2078E−02 |
| L2 | R1 | 0.0000E+00 | 7.5037E−02 | 0.0000E+00 | 8.0225E−03 |
|    | R2 | 0.0000E+00 | 5.9339E−02 | 0.0000E+00 | −7.5695E−04 |
| L3 | R1 | 0.0000E+00 | 9.8208E−02 | 0.0000E+00 | −5.0693E−02 |
|    | R2 | 0.0000E+00 | 1.1020E−01 | 0.0000E+00 | −3.3482E−02 |
| L4 | R1 | −1.4376E−02 | −1.6896E−01 | 2.6067E−01 | −1.0219E−01 |
|    | R2 | −4.0655E−01 | 5.1914E−02 | 1.9165E−02 | −5.1047E−03 |
| L5 | R1 | 2.1701E−01 | −4.6301E−02 | −3.1807E−02 | 1.0551E−02 |
|    | R2 | 1.3022E−01 | 1.5990E−03 | −2.6321E−02 | 5.8772E−03 |
| L6 | R1 | −2.0858E−02 | 7.1444E−03 | −1.5063E−03 | 1.1823E−04 |
|    | R2 | −1.2066E−02 | −3.2644E−03 | 1.9437E−03 | −2.2998E−04 |

Table 2-3 shows the angle of view (FOV), F number (Fno), and total track length (from an object-side surface of the 1st lens element to an imaging surface) of the six-piece optical lens system (TTL) of the six-piece optical lens system of the second embodiment. Table 2-3 also shows each value for L4ET/L4CT, L6ET/L6CT, CRA/TTL, CRA/f1234, fa/f1234, f1234/f56, fa/f56, and TTL/f56.

TABLE 2-3

| FOV | 65.6 deg |
|---|---|
| Fno | 2.4 |
| TTL | 5.8 |
| L4ET/L4CT | 1.8 |
| L6ET/L6CT | 0.4 |
| CRA/TTL | 2.6 |
| CRA/f1234 | 2.6 |
| fa/f1234 | 0.7 |
| f1234/f56 | 1.0 |
| fa/f56 | 0.7 |
| TTL/f56 | 1.0 |

FIG. 2-2 shows the longitudinal spherical aberration curve, the astigmatic field curve, and the distortion curve of the second embodiment of the present disclosure, which show the image quality.

FIG. 2-3 shows the incidence angle of a chief ray of the second embodiment of the present disclosure, which show a maximum incidence angle of the chief ray to an image sensor is less than 16 degrees.

Third Embodiment

FIG. 3-1 shows a cross-sectional illustration of a third embodiment of a six-piece optical lens system. FIG. 3-1 also shows a filter in front of an image sensor surface I.

In the third embodiment, the six-piece optical lens system comprises elements same as the First embodiment, providing F number which is smaller than that of the first embodiment.

Table 3-1 shows the radius of curvature (r) and the thickness or separation (d) for each of the optical surfaces, and refractive index (N) and the Abbe number (v) for each of the lens elements of the six-piece optical lens system of the third embodiment.

TABLE 3-1

| Surface | | Radius | Thickness | Refractive Index(N) | Abbe Number(v) |
|---|---|---|---|---|---|
| Stop | | Infinity | 0 | — | — |
| L1 | R1 | 2.586 | 0.322 | 1.54 | 56.0 |
|    | R2 | −2.733 | 0.030 | | |
| L2 | R1 | 1.156 | 0.200 | 1.67 | 19.2 |
|    | R2 | 0.734 | 0.370 | | |
| L3 | R1 | −5.051 | 0.457 | 1.54 | 56.0 |
|    | R2 | −0.797 | 0.030 | | |
| L4 | R1 | 3.595 | 0.260 | 1.57 | 37.4 |
|    | R2 | 0.552 | 0.336 | | |
| L5 | R1 | 4.883 | 0.839 | 1.54 | 55.6 |
|    | R2 | −1.602 | 0.067 | | |
| L6 | R1 | 2.398 | 0.685 | 1.54 | 55.6 |
|    | R2 | 2.473 | 0.340 | | |
| IRCF | R1 | Infinity | 0.210 | 1.52 | 64.2 |
|    | R2 | Infinity | 0.200 | | |
| Sensor | | Infinity | 0.000 | — | — |

Table 3-2 shows the aspheric coefficients for each of the optical surfaces of the six-piece optical lens system, wherein numbers 3, 4, 5, . . . , 10 represent the high-order of aspheric coefficients.

TABLE 3-2

ASPHERIC COEFFICIENTS

| Surface | | Conic | 3 | 4 | 5 | 6 |
|---|---|---|---|---|---|---|
| L1 | R1 | 0.0000 | 0.0000E+00 | −6.8354E−04 | 0.0000E+00 | −1.4443E−01 |
|    | R2 | 0.0000 | 0.0000E+00 | 3.5571E−01 | 1.0000E+00 | −9.7277E−01 |
| L2 | R1 | −10.0000 | 0.0000E+00 | 5.0946E−01 | 0.0000E+00 | −1.3313E+00 |
|    | R2 | −4.7255 | 0.0000E+00 | 4.7447E−01 | 0.0000E+00 | −9.0565E−01 |
| L3 | R1 | −10.0000 | 0.0000E+00 | 3.0541E−02 | 0.0000E+00 | −1.1965E−01 |
|    | R2 | −3.4272 | 0.0000E+00 | −3.5682E−01 | 0.0000E+00 | 7.8165E−01 |

TABLE 3-2-continued

ASPHERIC COEFFICIENTS

| | | | | | | |
|---|---|---|---|---|---|---|
| L4 | R1 | −0.9058 | −9.1769E−01 | −6.1128E−01 | 3.8699E+00 | −6.9111E+00 |
| | R2 | −3.8774 | −1.7904E+00 | 4.7252E+00 | −7.8631E+00 | 7.6888E+00 |
| L5 | R1 | 0.0000 | −2.8476E−01 | −1.9093E−01 | 2.9482E−01 | −2.7198E−01 |
| | R2 | 0.0000 | −1.2685E+00 | 1.9972E+00 | −1.1421E+00 | −2.1698E−01 |
| L6 | R1 | 0.0000 | −1.2097E+00 | 1.8720E+00 | −1.2954E+00 | 4.8909E−01 |
| | R2 | 0.0000 | 2.2095E−01 | −4.9983E−01 | 1.9162E−01 | −7.9665E−02 |

| | Surface | 7 | 8 | 9 | 10 |
|---|---|---|---|---|---|
| L1 | R1 | 0.0000E+00 | 1.2088E−01 | 0.0000E+00 | −3.0379E−01 |
| | R2 | 1.0000E+00 | 1.1992E+00 | 1.0000E+00 | −8.2535E−01 |
| L2 | R1 | 0.0000E+00 | 1.9361E+00 | 0.0000E+00 | −1.4124E+00 |
| | R2 | 0.0000E+00 | 1.1748E+00 | 0.0000E+00 | −8.0369E−01 |
| L3 | R1 | 0.0000E+00 | 3.2213E−01 | 0.0000E+00 | 9.6766E−03 |
| | R2 | 0.0000E+00 | −1.5470E+00 | 0.0000E+00 | 1.1199E+00 |
| L4 | R1 | 6.0765E+00 | −2.6824E+00 | 3.1708E−01 | 1.4738E−01 |
| | R2 | −3.7588E+00 | 1.6509E−01 | 5.7896E−01 | −1.4681E−01 |
| L5 | R1 | 3.1013E−01 | −8.8402E−02 | −1.3088E−01 | 7.8514E−02 |
| | R2 | 5.0264E−01 | −3.8098E−02 | −1.1151E−01 | 3.6459E−02 |
| L6 | R1 | −1.6964E−01 | 6.8002E−02 | −1.5915E−02 | 1.1802E−03 |
| | R2 | 1.1762E−01 | −6.4632E−02 | 8.1434E−03 | 1.1278E−03 |

Table 3-3 shows the angle of view (FOV), F number (Fno), and total track length (from an object-side surface of the 1st lens element to an imaging surface) of the six-piece optical lens system (TTL) of the six-piece optical lens system of the third embodiment. Table 3-3 also shows each value for L4ET/L4CT, L6ET/L6CT, CRA/TTL, CRA/f1234, fa/f1234, f1234/f56, fa/f56, and TTL/f56.

TABLE 3-3

| | |
|---|---|
| FOV | 79.4 deg |
| Fno | 2.0 |
| TTL | 4.3 |
| L4ET/L4CT | 2.0 |
| L6ET/L6CT | 0.3 |
| CRA/TTL | 2.4 |
| CRA/f1234 | 1.2 |
| fa/f1234 | 0.3 |
| f1234/f56 | 4.2 |
| fa/f56 | 1.3 |
| TTL/f56 | 2.1 |

FIG. 3-2 shows the longitudinal spherical aberration curve, the astigmatic field curve, and the distortion curve of the third embodiment of the present disclosure, which show the image quality.

FIG. 3-3 shows the incidence angle of a chief ray of the third embodiment of the present disclosure, which show a maximum incidence angle of the chief ray to an image sensor is less than 11 degrees.

Fourth Embodiment

Figures 1, 4:
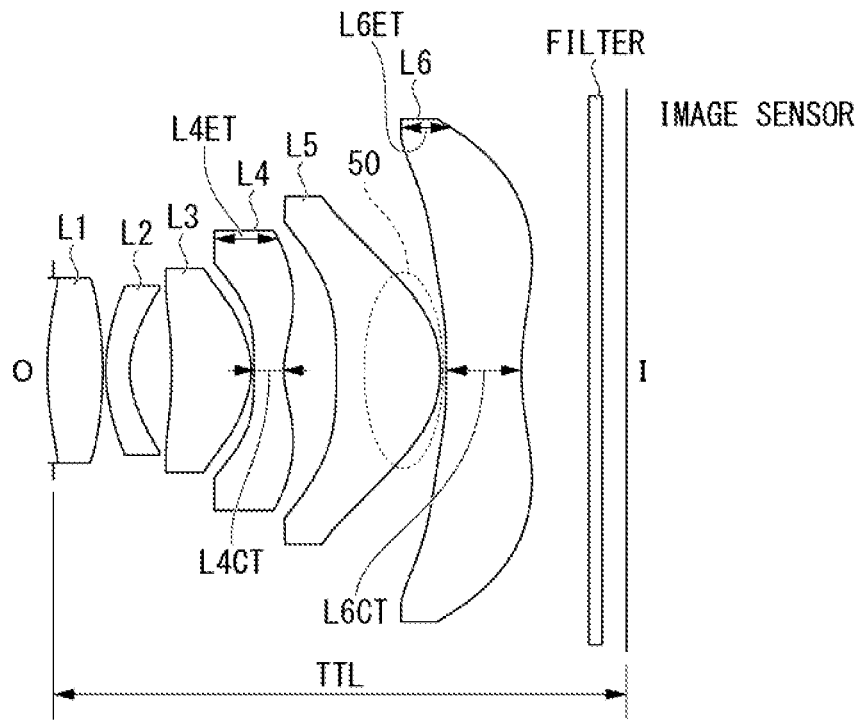
Figures 2, 4:
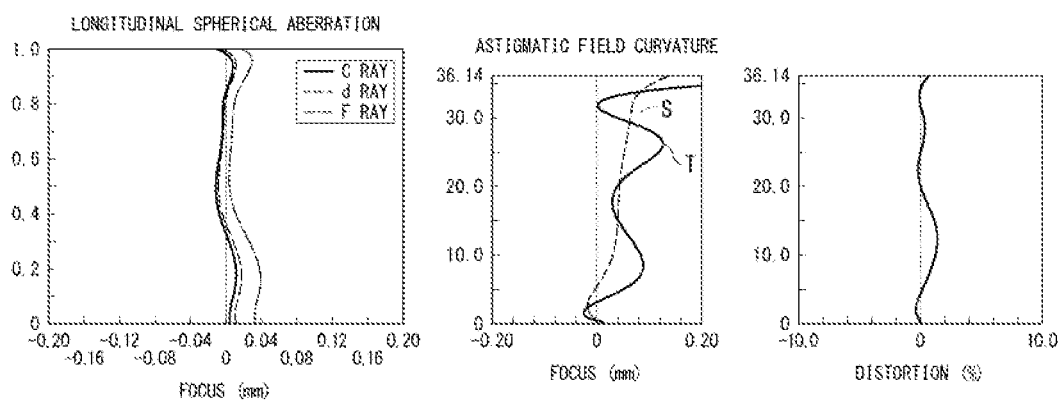
Figures 3, 4:
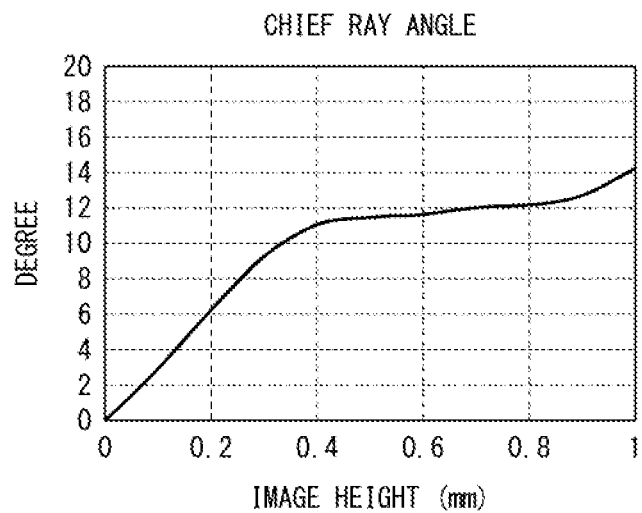

FIG. 4-1 shows a cross-sectional illustration of a fourth embodiment of a six-piece optical lens system. FIG. 4-1 also shows a filter in front of an image sensor surface I.

In the fourth embodiment, the six-piece optical lens system comprises elements same as the First embodiment, providing F number which is smaller than that of the first embodiment Table 4-1 shows the radius of curvature (r) and the thickness or separation (d) for each of the optical surfaces, and refractive index (N) and the Abbe number (v) for each of the lens elements of the six-piece optical lens system of the fourth embodiment.

TABLE 4-1

| Surface | | Radius | Thickness | Refractive Index(N) | Abbe Number(v) |
|---|---|---|---|---|---|
| Stop | | Infinity | −0.050 | — | — |
| L1 | R1 | 2.793 | 0.460 | 1.54 | 56.0 |
| | R2 | −2.425 | 0.022 | | |
| L2 | R1 | 1.143 | 0.200 | 1.67 | 19.2 |
| | R2 | 0.716 | 0.343 | | |
| L3 | R1 | −4.303 | 0.663 | 1.54 | 56.0 |
| | R2 | −0.736 | 0.022 | | |
| L4 | R1 | 3.038 | 0.248 | 1.57 | 37.4 |
| | R2 | 0.549 | 0.434 | | |
| L5 | R1 | 26.120 | 0.864 | 1.54 | 55.6 |
| | R2 | −1.741 | 0.049 | | |
| L6 | R1 | 3.000 | 0.622 | 1.54 | 55.6 |
| | R2 | 2.673 | 0.560 | | |
| IRCF | R1 | Infinity | 0.110 | 1.52 | 64.2 |
| | R2 | Infinity | 0.200 | | |
| Sensor | | Infinity | 0.000 | — | — |

Table 4-2 shows the aspheric coefficients for each of the optical surfaces of the six-piece optical lens system, wherein numbers 3, 4, 5, . . . , 10 represent the high-order of aspheric coefficients.

TABLE 4-2

ASPHERIC COEFFICIENTS

| Surface | | Conic | 3 | 4 | 5 | 6 |
|---|---|---|---|---|---|---|
| L1 | R1 | 0.0000 | 0.0000E+00 | 1.1330E−02 | 0.0000E+00 | −1.2632E−01 |
| | R2 | 0.0000 | 0.0000E+00 | 3.7468E−01 | 1.0000E+00 | −1.0222E+00 |
| L2 | R1 | −10.0000 | 0.0000E+00 | 4.8649E−01 | 0.0000E+00 | −1.4405E+00 |
| | R2 | −4.7255 | 0.0000E+00 | 4.2990E−01 | 0.0000E+00 | −8.6338E−01 |

TABLE 4-2-continued

ASPHERIC COEFFICIENTS

| | | | | | | |
|---|---|---|---|---|---|---|
| L3 | R1 | −10.0000 | 0.0000E+00 | −3.2690E−02 | 0.0000E+00 | −7.1565E−02 |
| | R2 | −3.4272 | 0.0000E+00 | −4.4082E−01 | 0.0000E+00 | 9.1945E−01 |
| L4 | R1 | −0.9058 | −9.5477E−01 | −5.7254E−01 | 3.8645E+00 | −6.8857E+00 |
| | R2 | −3.8774 | −1.8154E+00 | 4.7132E+00 | −7.8683E+00 | 7.6966E+00 |
| L5 | R1 | 0.0000 | −2.4257E−01 | −1.8025E−01 | 2.6483E−01 | −2.8370E−01 |
| | R2 | 0.0000 | −1.3090E+00 | 2.0101E+00 | −1.1119E+00 | −2.1611E−01 |
| L6 | R1 | 0.0000 | −1.2193E+00 | 1.8662E+00 | −1.2966E+00 | 4.8964E−01 |
| | R2 | 0.0000 | 2.1050E−01 | −4.9118E−01 | 1.9228E−01 | −8.1414E−02 |

| | Surface | 7 | 8 | 9 | 10 |
|---|---|---|---|---|---|
| L1 | R1 | 0.0000E+00 | 9.6246E−02 | 0.0000E+00 | −1.8576E−01 |
| | R2 | 1.0000E+00 | 1.1522E+00 | 1.0000E+00 | −6.2683E−01 |
| L2 | R1 | 0.0000E+00 | 1.9141E+00 | 0.0000E+00 | −1.3877E+00 |
| | R2 | 0.0000E+00 | 9.2876E−01 | 0.0000E+00 | −5.4186E−01 |
| L3 | R1 | 0.0000E+00 | 3.5544E−01 | 0.0000E+00 | 3.1299E−01 |
| | R2 | 0.0000E+00 | −1.8049E+00 | 0.0000E+00 | 1.2837E+00 |
| L4 | R1 | 6.0933E+00 | −2.6552E+00 | 3.6035E−01 | 2.2810E−01 |
| | R2 | −3.7634E+00 | 1.6171E−01 | 5.7771E−01 | −1.4102E−01 |
| L5 | R1 | 3.0732E−01 | −8.6285E−02 | −1.3020E−01 | 7.8850E−02 |
| | R2 | 4.9309E−01 | −4.6990E−02 | −1.1395E−01 | 3.7393E−02 |
| L6 | R1 | −1.6941E−01 | 6.8052E−02 | −1.5833E−02 | 1.2389E−03 |
| | R2 | 1.1727E−01 | −6.4731E−02 | 8.1649E−03 | 1.1253E−03 |

Table 4-3 shows the angle of view (FOV), F number (Fno), and total track length (from an object-side surface of the 1st lens element to an imaging surface) (TTL) of the six-piece optical lens system of the fourth embodiment. Table 4-3 also shows each value for L4ET/L4CT, L6ET/L6CT, CRA/TTL, CRA/f1234, fa/f1234, f1234/f56, fa/f56, and TTL/f56.

TABLE 4-3

| | |
|---|---|
| FOV | 72.3 deg |
| Fno | 2.0 |
| TTL | 4.8 |
| L4ET/L4CT | 2.0 |
| L6ET/L6CT | 0.5 |
| CRA/TTL | 3.0 |
| CRA/f1234 | 2.1 |
| fa/f1234 | 0.5 |
| f1234/f56 | 2.3 |
| fa/f56 | 1.1 |
| TTL/f56 | 1.6 |

FIG. 4-2 shows the longitudinal spherical aberration curve, the astigmatic field curve, and the distortion curve of the fourth embodiment of the present disclosure, which show the image quality.

FIG. 4-3 shows the incidence angle of a chief ray of the fourth embodiment of the present disclosure, which show a maximum incidence angle of the chief ray to an image sensor is less than 15 degrees.

Fifth Embodiment

Figures 1, 5:
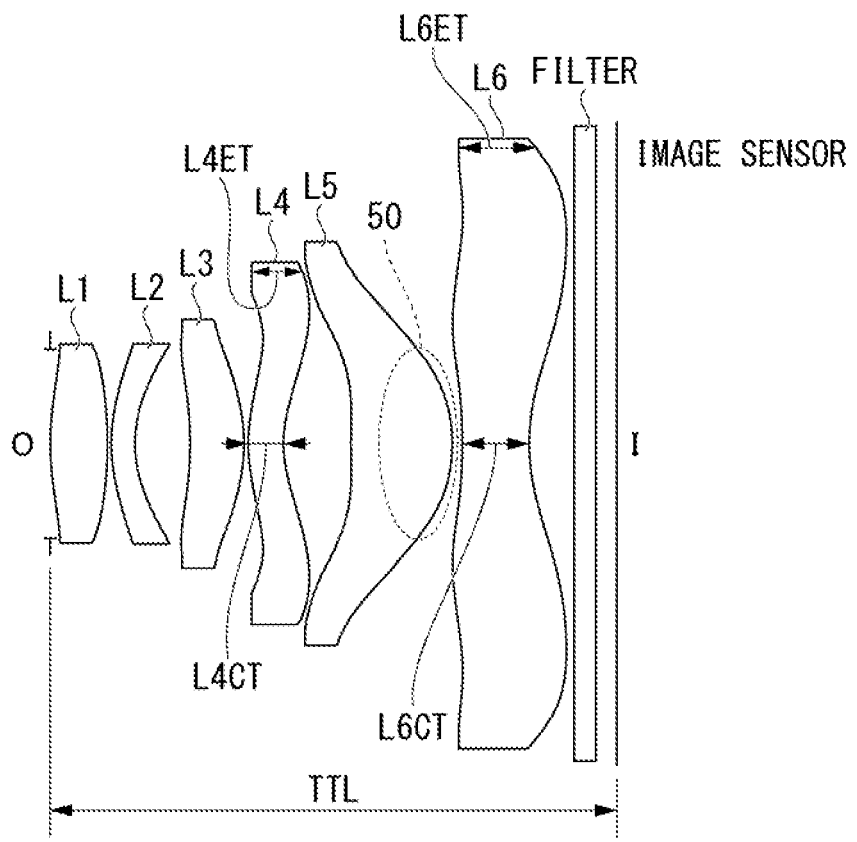
Figures 2, 5:
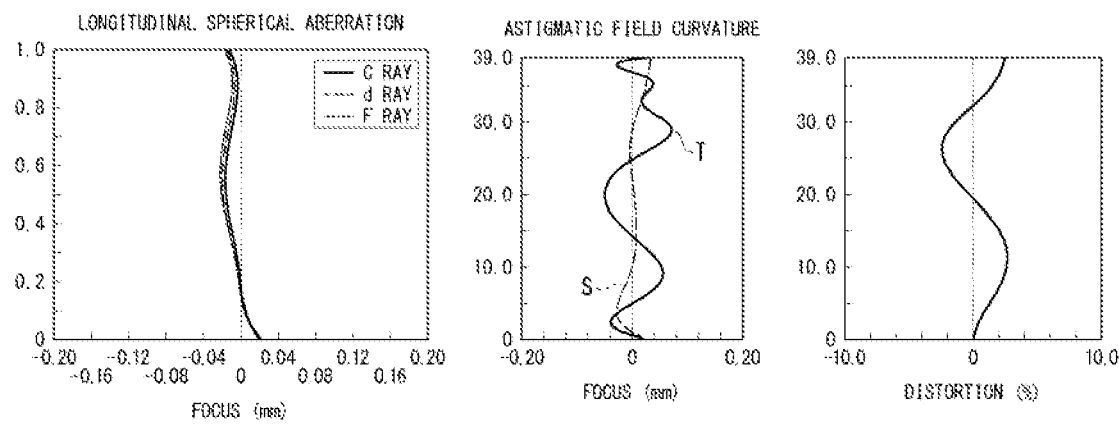
Figures 3, 5:
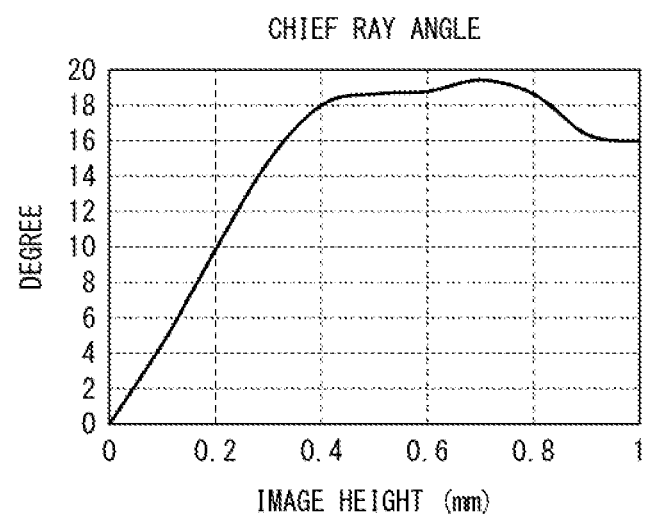

FIG. 5-1 shows a cross-sectional illustration of a fifth embodiment of a six-piece optical lens system. FIG. 5-1 also shows a filter in front of an image sensor surface I.

In the fifth embodiment, the six-piece optical lens system comprises elements same as the First embodiment, providing F number which is smaller than that of the first embodiment and TTL which is longer than that of the first embodiment.

Table 5-1 shows the radius of curvature (r) and the thickness or separation (d) for each of the optical surfaces, and refractive index (N) and the Abbe number (v) for each of the lens elements of the six-piece optical lens system of the fifth embodiment.

TABLE 5-1

| Surface | | Radius | Thickness | Refractive Index(N) | Abbe Number(v) |
|---|---|---|---|---|---|
| Stop | | Infinity | 0.000 | — | — |
| L1 | R1 | 3.065 | 0.530 | 1.54 | 56.0 |
| | R2 | −3.890 | 0.040 | | |
| L2 | R1 | 1.686 | 0.220 | 1.67 | 19.2 |
| | R2 | 1.100 | 0.520 | | |
| L3 | R1 | −2.818 | 0.503 | 1.54 | 56.0 |
| | R2 | −1.596 | 0.040 | | |
| L4 | R1 | 1.404 | 0.328 | 1.57 | 37.4 |
| | R2 | 0.912 | 0.632 | | |
| L5 | R1 | 10.254 | 0.950 | 1.54 | 55.6 |
| | R2 | −2.811 | 0.090 | | |
| L6 | R1 | 9.410 | 0.630 | 1.54 | 55.6 |
| | R2 | 3.460 | 0.420 | | |
| IRCF | R1 | Infinity | 0.200 | 1.52 | 64.2 |
| | R2 | Infinity | 0.200 | | |
| Sensor | | Infinity | 0.000 | — | — |

Table 5-2 shows the aspheric coefficients for each of the optical surfaces of the six-piece optical lens system, numbers 3, 4, 5, . . . , 10 represent the high-order of aspheric coefficients.

TABLE 5-2

ASPHERIC COEFFICIENTS

| | Surface | Conic | 3 | 4 | 5 | 6 |
|---|---|---|---|---|---|---|
| L1 | R1 | 0.0000 | 0.0000E+00 | −3.4956E−02 | 0.0000E+00 | −2.6388E−02 |
| | R2 | 0.0000 | 0.0000E+00 | 4.5939E−02 | 1.0000E+00 | −1.3407E−01 |

TABLE 5-2-continued

ASPHERIC COEFFICIENTS

| | | | | | | |
|---|---|---|---|---|---|---|
| L2 | R1 | −10.0000 | 0.0000E+00 | 1.2059E−01 | 0.0000E+00 | −1.5682E−01 |
| | R2 | −4.7255 | 0.0000E+00 | 1.4283E−01 | 0.0000E+00 | −1.0736E−01 |
| L3 | R1 | −10.0000 | 0.0000E+00 | 7.1731E−02 | 0.0000E+00 | −1.3648E−01 |
| | R2 | −3.4272 | 0.0000E+00 | 1.1412E−01 | 0.0000E+00 | −2.4986E−01 |
| L4 | R1 | −0.9058 | −2.8744E−01 | 1.3526E−01 | 3.3540E−01 | −1.0199E+00 |
| | R2 | −3.8774 | −5.8107E−01 | 1.2429E+00 | −1.5811E+00 | 1.2065E+00 |
| L5 | R1 | 0.0000 | −1.1544E−01 | −1.5962E−01 | 3.3636E−02 | −1.2117E−01 |
| | R2 | 0.0000 | −7.7850E−01 | 9.4852E−01 | −4.8591E−01 | 8.7297E−03 |
| L6 | R1 | 0.0000 | −5.7755E−01 | 6.9279E−01 | −3.0080E−01 | 6.5229E−02 |
| | R2 | 0.0000 | 4.1118E−01 | −5.4992E−01 | 2.1525E−01 | −1.9675E−02 |

| Surface | | 7 | 8 | 9 | 10 |
|---|---|---|---|---|---|
| L1 | R1 | 0.0000E+00 | −1.8629E−02 | 0.0000E+00 | −1.036E−02 |
| | R2 | 1.0000E+00 | 6.4333E−02 | 1.0000E+00 | −2.1498E−02 |
| L2 | R1 | 0.0000E+00 | 7.5449E−02 | 0.0000E+00 | −5.7499E−03 |
| | R2 | 0.0000E+00 | 3.0618E−02 | 0.0000E+00 | 3.8937E−03 |
| L3 | R1 | 0.0000E+00 | 1.9930E−01 | 0.0000E+00 | −7.3152E−02 |
| | R2 | 0.0000E+00 | 2.0457E−01 | 0.0000E+00 | −4.6661E−02 |
| L4 | R1 | 8.9760E−01 | −2.9199E−01 | −1.4707E−02 | 2.1057E−02 |
| | R2 | −5.7593E−01 | 1.2694E−01 | 1.7084E−02 | −1.0853E−02 |
| L5 | R1 | 2.2867E−01 | −4.7769E−02 | −4.3997E−02 | 1.4588E−02 |
| | R2 | 8.9197E−02 | −7.3066E−03 | −1.3508E−02 | 3.0664E−03 |
| L6 | R1 | −1.9821E−02 | 6.8108E−03 | −8.3278E−04 | −6.6316E−06 |
| | R2 | 2.6551E−03 | −5.6596E−03 | 1.5858E−03 | −9.9300E−05 |

Table 5-3 shows the angle of view (FOV), F number (Fno), and total track length (from an object-side surface of the 1st lens element to an imaging surface) of the six-piece optical lens system (TTL) of the six-piece optical lens system of the fifth embodiment. Table 5-3 also shows each value for L4ET/L4CT, L6ET/L6CT, CRA/TTL, CRA/f1234, fa/f1234, f1234/f56, fa/f56, and TTL/f56.

TABLE 5-3

| FOV | 78.0 deg |
|---|---|
| Fno | 2.0 |
| TTL | 5.3 |
| L4ET/L4CT | 1.2 |
| L6ET/L6CT | 0.8 |
| CRA/TTL | 3.7 |
| CRA/f1234 | 3.7 |
| fa/f1234 | 0.7 |
| f1234/f56 | 0.9 |
| fa/f56 | 0.6 |
| TTL/f56 | 0.9 |

FIG. 5-2 shows the longitudinal spherical aberration curve, the astigmatic field curve, and the distortion curve of the fifth embodiment of the present disclosure, which show the image quality.

FIG. 5-3 shows the incidence angle of a chief ray of the fifth embodiment of the present disclosure, which show a maximum incidence angle of the chief ray to an image sensor is less than 20 degrees.

Sixth Embodiment

Figures 1, 6:
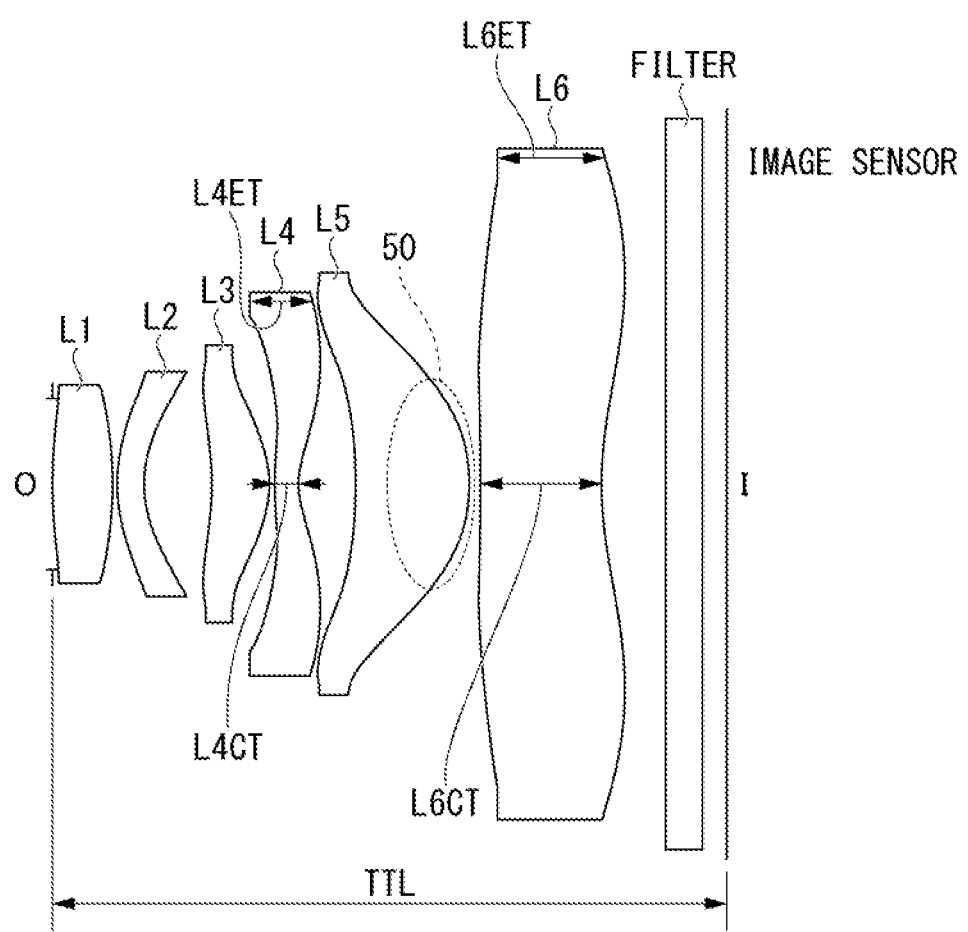
Figures 2, 6:
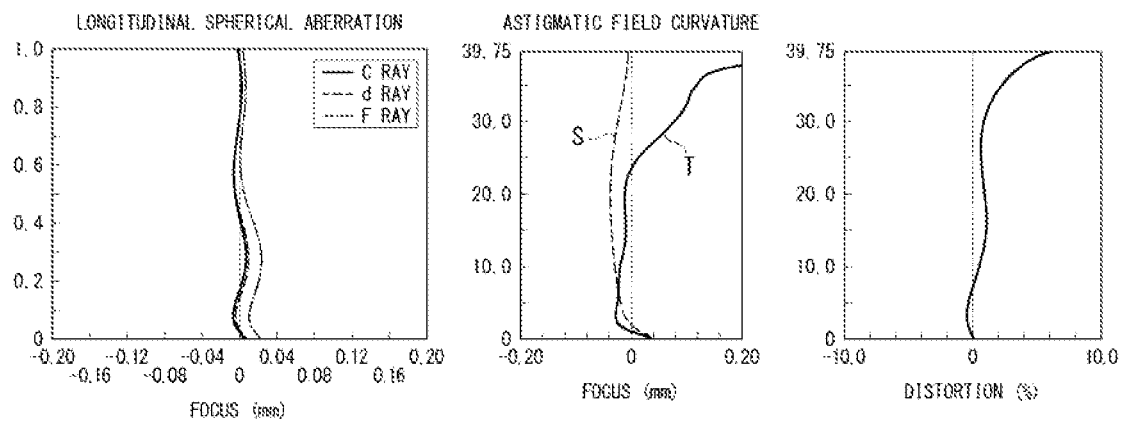
Figures 3, 6:
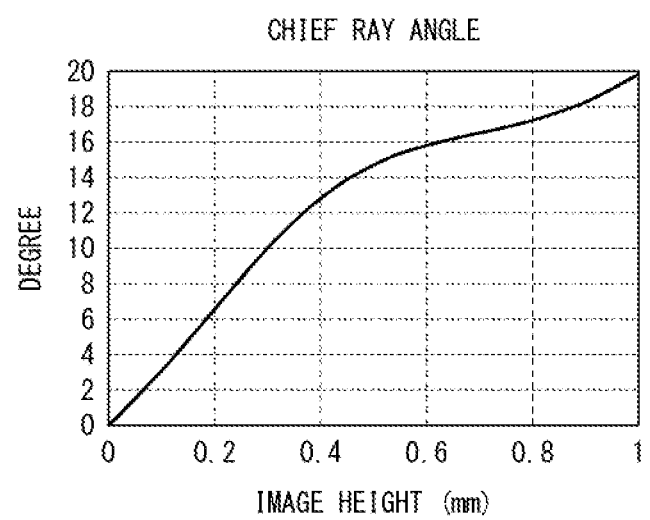

FIG. 6-1 shows a cross-sectional illustration of a sixth embodiment of a six-piece optical lens system. FIG. 6-1 also shows a filter in front of an image sensor surface I.

In the sixth embodiment, the six-piece optical lens system comprises elements same as the First embodiment, providing F number which is smaller than that of the first embodiment and TTL which is longer than that of the first embodiment.

Table 6-1 shows the radius of curvature (r) and the thickness or separation (d) for each of the optical surfaces, and refractive index (N) and the Abbe number (v) for each of the lens elements of the six-piece optical lens system of the sixth embodiment.

TABLE 6-1

| Surface | | Radius | Thickness | Refractive Index(N) | Abbe Number(v) |
|---|---|---|---|---|---|
| Stop | | Infinity | 0.000 | — | — |
| L1 | R1 | 4.417 | 0.492 | 1.54 | 56.0 |
| | R2 | −2.927 | 0.040 | | |
| L2 | R1 | 1.359 | 0.220 | 1.67 | 19.2 |
| | R2 | 0.920 | 0.559 | | |
| L3 | R1 | −3.067 | 0.477 | 1.54 | 56.0 |
| | R2 | −0.868 | 0.040 | | |
| L4 | R1 | 1.564 | 0.200 | 1.57 | 37.4 |
| | R2 | 0.608 | 0.469 | | |
| L5 | R1 | −8.402 | 0.937 | 1.54 | 55.6 |
| | R2 | −2.058 | 0.090 | | |
| L6 | R1 | 3.589 | 1.000 | 1.54 | 55.6 |
| | R2 | 3.926 | 0.530 | | |
| IRCF | R1 | Infinity | 0.300 | 1.52 | 64.2 |
| | R2 | Infinity | 0.200 | | |
| Sensor | | Infinity | 0.000 | — | — |

Table 6-2 shows the aspheric coefficients for each of the optical surfaces of the six-piece optical lens system, wherein numbers 3, 4, 5, . . . , 10 represent the high-order of aspheric coefficients.

TABLE 6-2

ASPHERIC COEFFICIENTS

| Surface | | Conic | 3 | 4 | 5 | 6 |
|---|---|---|---|---|---|---|
| L1 | R1 | 0.0000 | 0.0000E+00 | −1.9950E−02 | 0.0000E+00 | −1.8768E−02 |
| | R2 | 0.0000 | 0.0000E+00 | 1.3900E−01 | 0.0000E+00 | −2.4015E−01 |
| L2 | R1 | −10.0000 | 0.0000E+00 | 2.5724E−01 | 0.0000E+00 | −4.0285E−01 |
| | R2 | −4.7255 | 0.0000E+00 | 2.2977E−01 | 0.0000E+00 | −2.7433E−01 |
| L3 | R1 | −10.0000 | 0.0000E+00 | 1.0907E−02 | 0.0000E+00 | 1.3088E−02 |
| | R2 | −3.4272 | 0.0000E+00 | 6.9016E−02 | 0.0000E+00 | −2.0105E−01 |
| L4 | R1 | −0.9058 | −3.5260E−01 | −8.4244E−01 | 1.9533E+00 | −1.8315E+00 |
| | R2 | −3.8774 | −6.8964E−01 | 1.0151E+00 | −1.1483E+00 | 9.3297E−01 |
| L5 | R1 | 0.0000 | 1.8362E−01 | 1.3560E−01 | −1.5423E−02 | −2.2817E−01 |
| | R2 | 0.0000 | −6.0783E−01 | 7.4010E−01 | −3.4020E−01 | −1.7423E−02 |
| L6 | R1 | 0.0000 | −5.0622E−01 | 6.0808E−01 | −3.3015E−01 | 9.7008E−02 |
| | R2 | 0.0000 | 1.1422E−01 | −1.8575E−01 | 2.7866E−02 | 2.7684E−02 |

| Surface | | | 7 | 8 | 9 | 10 |
|---|---|---|---|---|---|---|
| | L1 | R1 | 0.0000E+00 | −2.5381E−02 | 0.0000E+00 | −1.4978E−02 |
| | | R2 | 0.0000E+00 | 1.2579E−01 | 0.0000E+00 | −2.8862E−02 |
| | L2 | R1 | 0.0000E+00 | 2.3697E−01 | 0.0000E+00 | −4.4653E−02 |
| | | R2 | 0.0000E+00 | 1.1799E−01 | 0.0000E+00 | −5.1303E−03 |
| | L3 | R1 | 0.0000E+00 | 1.6031E−01 | 0.0000E+00 | −1.0042E−01 |
| | | R2 | 0.0000E+00 | 3.4469E−01 | 0.0000E+00 | −1.3757E−01 |
| | L4 | R1 | 7.6979E−01 | 3.4331E−02 | −1.2290E−01 | 1.9054E−02 |
| | | R2 | −5.2376E−01 | 1.9582E−01 | −4.2634E−02 | 3.5403E−03 |
| | L5 | R1 | 2.2065E−01 | −2.6817E−02 | −2.9184E−02 | 7.7215E−03 |
| | | R2 | 3.8072E−02 | 2.1143E−02 | −9.6939E−03 | 3.8184E−04 |
| | L6 | R1 | −2.3158E−02 | 8.8417E−03 | −1.2641E−03 | 7.7730E−05 |
| | | R2 | −1.0343E−02 | −2.4667E−03 | 1.7619E−03 | −2.3601E−04 |

Table 6-3 shows the angle of view (FOV), F number (Fno), and total track length (from an object-side surface of the 1st lens element to an imaging surface) of the six-piece optical lens system (TTL) of the six-piece optical lens system of the sixth embodiment. Table 6-3 also shows each value for L4ET/L4CT, L6ET/L6CT, CRA/TTL, CRA/f1234, fa/f1234, f1234/f56, fa/f56, and TTL/f56.

TABLE 6-3

| FOV | 79.5 deg |
|---|---|
| Fno | 2.2 |
| TTL | 5.6 |
| L4ET/L4CT | 2.5 |
| L6ET/L6CT | 0.9 |
| CRA/TTL | 3.6 |
| CRA/f1234 | 3.2 |
| fa/f1234 | 0.6 |
| f1234/f56 | 1.5 |
| fa/f56 | 0.9 |
| TTL/f56 | 1.4 |

FIG. 6-2 shows the longitudinal spherical aberration curve, the astigmatic field curve, and the distortion curve of the sixth embodiment of the present disclosure, which show the preferable image quality.

FIG. 6-3 shows the incidence angle of a chief ray of the sixth embodiment of the present disclosure, which show a maximum incidence angle of the chief ray to an image sensor is less than 20 degrees.

As can be seen from the optical data, the six-piece optical lens systems according to the present disclosure show the image quality while having a low incidence angle to the image sensor and short TTL. This is accomplished when it satisfies the following relations:

$$1.05 < L4ET/L4CT < 2.7; \quad (1)$$

It should be noted that L4ET is the edge thickness of the 4th lens element, and L4CT is the center thickness of the 4th lens element.

$$0.23 < L6ET/L6CT < 0.95; \quad (2)$$

It should be noted that L6ET is the edge thickness of the 6th lens element, and L6CT is the center thickness of the 6th lens element.

$$2.2 < CRA/TTL < 4.0; \quad (3)$$

It should be noted that CRA is a maximum incidence angle of the chief ray to an image sensor, and TTL is a total track length of the six-piece optical lens system.

$$1.2 < CRA/f1234 < 4.0; \quad (4)$$

It should be noted that CRA is a maximum incidence angle of the chief ray to an image sensor, and f1234 is a composite focal length from the 1st lens element to the 4th lens element.

$$0.27 < fa/f1234 < 0.77; \quad (5)$$

It should be noted that fa is a focal length of the six-piece optical lens system, and f1234 is a composite focal length from the 1st lens element to the 4th lens element.

$$0.77 < f1234/f56 < 4.5; \quad (6)$$

It should be noted that f1234 is a composite focal length from the 1st lens element to the 4th lens element, and f56 is a composite focal length from the 5th lens element to the 6th lens element.

$$0.55 < fa/f56 < 1.4; \quad (7)$$

It should be noted that fa is a focal length of the six-piece optical lens system, and f56 is a composite focal length from the 5th lens element to the 6th lens element.

$$0.75 < TTL/f56 < 2.2; \quad (8)$$

It should be noted that TTL is a total track length of the six-piece optical lens system, and f56 is a composite focal length from the 5th lens element to the 6th lens element.

The relation (1) defines the optimal shape of the fourth lens for lowering the incident angle to the image sensor.

When L4ET/L4CT is smaller than the lower limit, the effect of lowering the incident angle to the image sensor is reduced. On the contrary, when L4ET/L4CT exceed the upper limit, an extremely uneven shape is formed, and the moldability is greatly impaired.

From this point of view, the following range is more preferable for L4ET/L4CT.

$$1.6 < L4ET/L4CT < 2.2 \tag{1}-2$$

The relation (2) specifies the optimal shape of the sixth lens for lowering the incident angle to the image sensor. When L6ET/L6CT is smaller than the lower limit, an extremely uneven shape is formed, and the moldability is greatly impaired. Conversely, when L6ET/L6CT exceed the upper limit, the effect of lowering the incident angle to the image sensor will decrease.

From this point of view, the following range is more preferable for L6ET/L6CT.

$$0.3 < L6ET/L6CT < 0.8 \tag{2}-2$$

The relation (3) ensures preferable optical performance and defines the optimum conditions for the incident angle to the image sensor and optical total length. When CRA/TTL is smaller than the lower limit, the optical performance may be satisfied, but the total optical length becomes too long. When CRA/TTL exceeds the upper limit, the total optical length is shortened as well as the optical performance is greatly impaired.

From this viewpoint, the following range is more preferable for CRA/TTL.

$$2.2 < CRA/TTL < 3.1 \tag{3}-2$$

The relation (4) defines the conditions for lowering the incident angle to the image sensor and realizing preferable optical performance. When f1234 is designed to be smaller than the lower limit, the refractive power from the first lens to the fourth lens will be too small to ensure optical performance and reduce the height. When f1234 exceeds the upper limit, the angle of the light beam that passes through L4 becomes too steep to lower the incident angle to the image sensor.

From this point of view, the following range is more preferable for f1234.

$$1.9 < CRA/f1234 < 3.3 \tag{4}-2$$

The relation (5) regulates the balance between the total refractive power from the first lens to the fourth lens and the total optical length in order to lower the incident angle to the image sensor and ensure preferable good optical performance. When fa/f1234 is smaller than the lower limit, the refractive power from the first to the fourth lens becomes too small to reduce the total optical length. When fa/f1234 exceeds the upper limit, the refractive power is biased toward the object side of the lens, and it becomes difficult to lower the incident angle to the image sensor.

From this point of view, the following range is more preferable for fa/f1234.

$$0.4 < fa/f1234 < 0.77 \tag{5}-2$$

The relation (6) defines the refractive power of the fifth lens and the sixth lens for lowering the incident angle to the image sensor and ensuring preferable optical performance. When f1234/f56 is smaller than the lower limit, the refractive power of the fifth lens and the sixth lens becomes too small to lower the incident angle to the image sensor is diminished. When f1234/f56 exceeds the upper limit, the refractive power is excessively biased toward the fifth lens and the sixth lens, making it difficult to ensure preferable optical performance.

From this point of view, the following range is more preferable for f1234/f56.

$$1.0 < f1234/f56 < 2.5 \tag{6}-2$$

The relation (7) defines the balance of the combined refractive power from the fifth lens to the sixth lens in order to lower the incident angle to the image sensor and reduce the overall optical length. When fa/f56 is smaller than the lower limit, the refractive power of the fifth lens and the sixth lens becomes too small to lower the incident angle. When fa/f56 exceeds the upper limit, the refractive power becomes too strong to reduce the overall optical length.

From this point of view, the following range is more preferable for fa/f56.

$$0.7 < fa/f56 < 1.4 \tag{7}-2$$

The relation (8) defines the balance between the combined refractive power from the fifth lens to the sixth lens and the total optical length in order to reduce the height of the total optical length while lowering the incident angle to the image sensor. If TTL/f56 becomes smaller than the lower limit, the effect of lowering the incident angle to the image sensor is diminished. When TTL/f56 exceeds the upper limit, it will be difficult to reduce the optical total length.

From this viewpoint, the following range is more preferable for TTL/f56.

$$0.95 < TTL/f56 < 1.75 \tag{8}-2$$

Further, a camera is provided. The camera in present disclosure comprises the six-piece optical lens system of the present disclosure, an optical filter, and an image sensor. The six-piece optical lens system is configured to input light, which is used to project an image to the image sensor; and the image sensor is configured to convert the image into a digital image data. With another embodiment, various optical filters can be used in front of the image sensor because the six-piece optical lens system has a very low incident angle to the image sensor so that the camera is capable of using many kinds of optical filters with various incidence angle dependence while the camera has TTL which is short enough to be installed in a mobile device.

Figure 7:
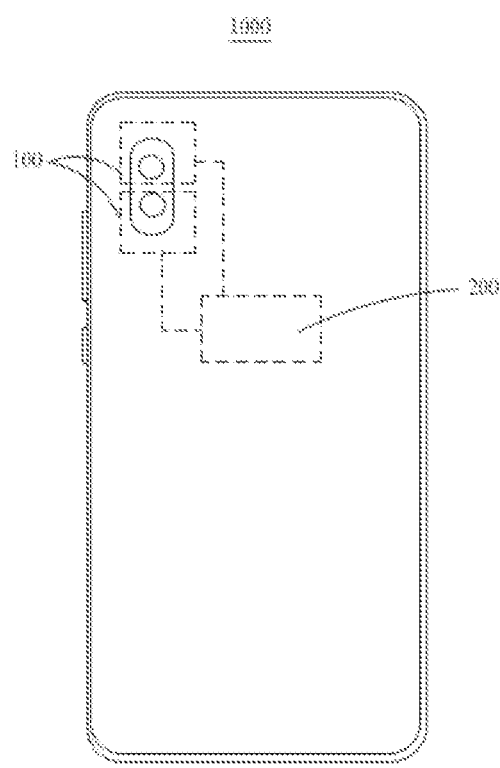
FIG. 7 shows an embodiment of the present disclosure.

FIG. 7 shows a terminal 1000 disclosed in the present disclosure. The terminal 1000 comprises cameras 100 provided in the above embodiments and a Graphic Processing Unit (GPU) 200. The camera 100 is configured to convert an image through a six-piece optical lens system of the present disclosure to a digital image data and input the digital image data into the GPU 200, and the GPU 200 is configured to process the image data received from the camera.

In FIG. 7, the terminal comprises two cameras 100. However, the terminal may comprise a single or more than two camera(s) and it (or they) could be connected to the single GPU 200. The terminal 1000 can be applied to a high resolution mobile device camera such as a mobile phone camera because of its high resolution, short TTL, low height and low CRA.

A person skilled in the art would understand that lowering the incident angle to the image sensor and shorting TTL contradict each other. The present disclosure satisfies the double requirements by satisfying the above-mentioned relations.

The term "low CRA" should be understood as the lens has a low incidence angle to the image sensor, and in one embodiment, a maximum incidence angle of the chief ray to an image sensor is less than 10°.

Although the lens system according to the present disclosure can be applied especially to the mobile phone camera, it can be also applied to cameras in any mobile device such as a tablet type device and wearable device or any sensing camera such as a hyper spectrum camera, which has some angle dependence structure.

Although preferred embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A six-piece optical lens system including six lens elements, in order from an object side surface to an image side surface, comprising:
a 1st lens element with a positive refractive power;
a 2nd lens element with a negative refractive power;
a 3rd lens element with a positive refractive power;
a 4th lens element with a negative refractive power; and
a 5th lens element with a positive refractive power, having a convex image-side surface in the center, wherein LACT is a center thickness of the 4th lens element, L4ET is an edge thickness of the 4th lens element, L6CT is a center thickness of a 6th lens element, L6ET is an edge thickness of the 6th lens element, and the following relations are satisfied:

$1.05 < L4ET/L4CT < 2.7$; and $0.23 < L6ET/L6CT < 0.95$.

2. The six-piece optical lens system as claimed in claim 1, wherein $1.6 < L4ET/L4CT < 2.2$, and $0.3 < L6ET/L6CT < 0.8$.

3. The six-piece optical lens system as claimed in claim 1, wherein a maximum incidence angle of a chief ray to an image sensor is CRA, a total track length of the six-piece optical lens system is TTL, and the following relation is satisfied:

$2.2 < CRA/TTL < 4.0$.

4. The six-piece optical lens system as claimed in claim 3, wherein $2.2 < CRA/TTL < 3.1$.

5. The six-piece optical lens system as claimed in claim 1, wherein a maximum incidence angle of a chief ray to an image sensor is CRA, a composite focal length from the 1st lens element to the 4th lens element is f1234, and the following relation is satisfied:

$1.2 < CRA/f1234 < 4.0$.

6. The six-piece optical lens system as claimed in claim 5, wherein $1.9 < CRA/f1234 < 3.3$.

7. The six-piece optical lens system as claimed in claim 1, wherein a composite focal length from the 1st lens element to the 4th lens element is f1234, a focal length of the six-piece optical lens system is fa, and the following relation is satisfied:

$0.27 < fa/f1234 < 0.77$.

8. The six-piece optical lens system as claimed in claim 7, wherein $0.4 < fa/f1234 < 0.77$.

9. The six-piece optical lens system as claimed in claim 1, wherein a composite focal length from the 1st lens element to the 4th lens element is f1234, a composite focal length from the 5th lens element to the 6th lens element is f56, and the following relation is satisfied:

$0.77 < f1234/f56 < 4.5$.

10. The six-piece optical lens system as claimed in claim 9, wherein $1.0 < f1234/f56 < 2.5$.

11. The six-piece optical lens system as claimed in claim 1, wherein a focal length of the six-piece optical lens system is fa, a composite focal length from the 5th lens element to the 6th lens element is f56, and the following relation is satisfied:

$0.55 < fa/f56 < 1.4$.

12. The six-piece optical lens system as claimed in claim 11, wherein $0.7 < fa/f56 < 1.4$.

13. The six-piece optical lens system as claimed in claim 1, wherein a total track length of the six-piece optical lens system is TTL, a composite focal length from the 5th lens element to the 6th lens element is f56, and the following relation is satisfied:

$0.75 < TTL/f56 < 2.2$.

14. The six-piece optical lens system as claimed in claim 13, wherein $0.95 < TTL/f56 < 1.75$.

15. A camera comprising:
a six-piece optical lens system;
an optical filter; and
an image sensor, wherein, the six-piece optical lens system includes six lens elements, in order from an object side surface to an image side surface, comprising:
a 1st lens element with a positive refractive power;
a 2nd lens element with a negative refractive power;
a 3rd lens element with a positive refractive power;
a 4th lens element with a negative refractive power; and
a 5th lens element with a positive refractive power, having a convex image-side surface in the center, wherein LACT is a center thickness of the 4th lens element, L4ET is an edge thickness of the 4th lens element, L6CT is a center thickness of a 6th lens element, L6ET is an edge thickness of the 6th lens element, and the following relations are satisfied:

$1.05 < L4ET/L4CT < 2.7$; and $0.23 < L6ET/L6CT < 0.95$, wherein the six-piece optical lens system is configured to project an image onto the image sensor, the optical filter is disposed between the six-piece optical lens system and the image sensor to pass light of a predetermined wavelength, and the image sensor is configured to convert the image into a digital image data.

16. The camera as claimed in claim 15, wherein $1.6 < L4ET/L4CT < 2.2$, and $0.3 < L6ET/L6CT < 0.8$.

17. The camera as claimed in claim 15, wherein a maximum incidence angle of a chief ray to an image sensor is CRA, a total track length of the six-piece optical lens system is TTL, and the following relation is satisfied:

$2.2 < CRA/TTL < 4.0$.

18. The camera as claimed in claim 17, wherein $2.2 < CRA/TTL < 3.1$.

19. The camera as claimed in claim 15, wherein a maximum incidence angle of a chief ray to an image sensor is CRA, a composite focal length from the 1st lens element to the 4th lens element is f1234, and the following relation is satisfied:

$1.2 < CRA/f1234 < 4.0$.

20. A terminal comprising:
a camera and a Graphic Processing Unit (GPU), the camera comprising:
   a six-piece optical lens system;
   an optical filter; and
   an image sensor, wherein, the six-piece optical lens system includes six lens elements, in order from an object side surface to an image side surface, comprising:
      a 1st lens element with a positive refractive power;
      a 2nd lens element with a negative refractive power;
      a 3rd lens element with a positive refractive power;
      a 4th lens element with a negative refractive power; and
      a 5th lens element with a positive refractive power, having a convex image-side surface in the center,
      wherein L4CT is a center thickness of the 4th lens element, L4ET is an edge thickness of the 4th lens element, L6CT is a center thickness of a 6th lens element, L6ET is an edge thickness of the 6th lens element, and the following relations are satisfied:

$1.05 < L4ET/L4CT < 2.7$; and $0.23 < L6ET/L6CT < 0.95$, wherein the six-piece optical lens system is configured to project an image onto the image sensor, the optical filter is disposed between the six-piece optical lens system and the image sensor to pass light of a predetermined wavelength, and the image sensor is configured to convert the image into a digital image data, wherein the GPU is connected with the camera to receive and process the digital image data.

* * * * *

UNITED STATES PATENT AND TRADEMARK OFFICE
CERTIFICATE OF CORRECTION

| | | |
|---|---|---|
| PATENT NO. | : 12,405,449 B2 | Page 1 of 1 |
| APPLICATION NO. | : 17/722070 | |
| DATED | : September 2, 2025 | |
| INVENTOR(S) | : Yasuhide Nihei | |

It is certified that error appears in the above-identified patent and that said Letters Patent is hereby corrected as shown below:

In the Claims

In Column 21, Claim 1, Line 25, delete "LACT" and insert --L4CT--.

In Column 22, Claim 15, Line 36, delete "LACT" and insert --L4CT--.

In Column 23, Claim 20, Line 17, delete "LACT" and insert --L4CT--.

Signed and Sealed this
Twenty-seventh Day of January, 2026

John A. Squires
*Director of the United States Patent and Trademark Office*